(12) United States Patent
Matsuhana et al.

(10) Patent No.: US 10,820,399 B2
(45) Date of Patent: Oct. 27, 2020

(54) X-RAY INSPECTION DEVICE AND METHOD FOR DETERMINING DEGREE OF CONSUMPTION OF TARGET OF X-RAY TUBE IN X-RAY INSPECTION DEVICE

(71) Applicant: SHIMADZU CORPORATION, Kyoto (JP)

(72) Inventors: Bunta Matsuhana, Kyoto (JP); Goro Kambe, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 113 days.

(21) Appl. No.: 16/288,782

(22) Filed: Feb. 28, 2019

(65) Prior Publication Data

US 2019/0380193 A1  Dec. 12, 2019

(30) Foreign Application Priority Data

Jun. 8, 2018  (JP) ................................. 2018-110464

(51) Int. Cl.
*H05G 1/54* (2006.01)
*G01N 23/083* (2018.01)

(52) U.S. Cl.
CPC ............. *H05G 1/54* (2013.01); *G01N 23/083* (2013.01); *G01N 2223/04* (2013.01); *G01N 2223/204* (2013.01)

(58) Field of Classification Search
CPC ............. G01N 23/083; G01N 2223/04; G01N 2223/204; H05G 1/54
See application file for complete search history.

(56) References Cited

FOREIGN PATENT DOCUMENTS

| DE | 102011075804 A1 | * 11/2012 | ............. A61B 6/582 |
| JP | 1993188018 A | 7/1993 | |
| JP | 2015150054 A | 8/2015 | |
| WO | 2003092336 A | 11/2003 | |
| WO | WO-2017060814 A1 | * 4/2017 | ............... H05G 1/26 |

* cited by examiner

*Primary Examiner* — Mark R Gaworecki
(74) *Attorney, Agent, or Firm* — Renner, Otto, Boisselle & Sklar, LLP

(57) ABSTRACT

An X-ray inspection device comprises: an X-ray tube configured to cause an electron beam to collide with a target, thereby generating an X-ray; an X-ray detector configured to detect the X-ray having been output from the X-ray tube and having been transmitted through an inspection target object; a measurement section configured to detect the X-ray output from the X-ray tube for a predetermined period by the X-ray detector to detect an X-ray amount in the predetermined period, thereby measuring a maximum value Imax and a minimum value Imin of the X-ray amount in the predetermined period; and a calculation section configured to calculate an X-ray amount fluctuation rate by using the maximum value Imax and the minimum value Imin of the X-ray amount measured by the measurement section.

14 Claims, 6 Drawing Sheets

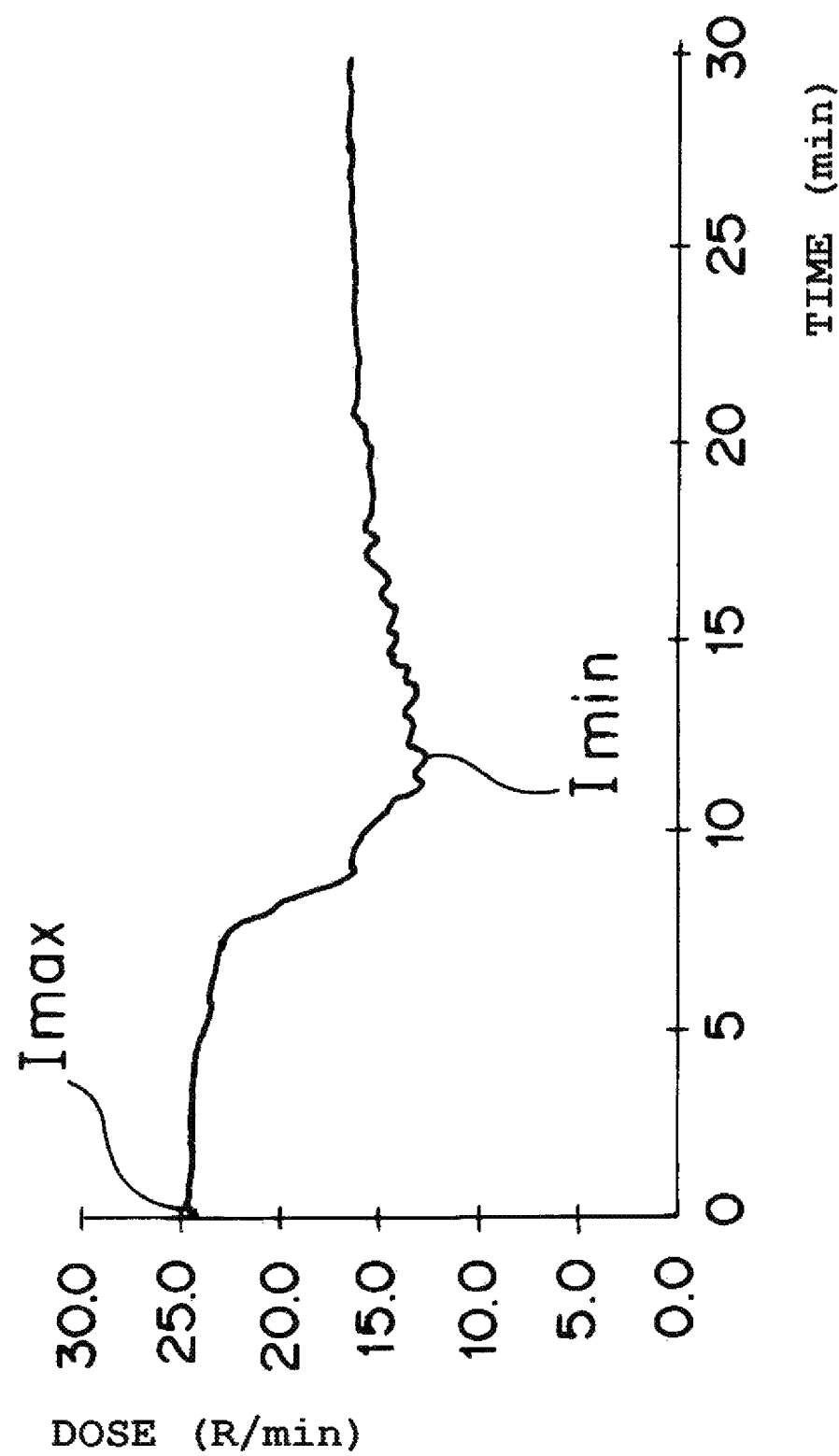

X-RAY INSPECTION DEVICE AND METHOD FOR DETERMINING DEGREE OF CONSUMPTION OF TARGET OF X-RAY TUBE IN X-RAY INSPECTION DEVICE

BACKGROUND OF THE INVENTION

1. Technical Field

The present invention relates to an X-ray inspection device and the method for determining the degree of consumption of a target of an X-ray tube in the X-ray inspection device.

2. Background Art

There is, as one type of an X-ray inspection device, an X-ray inspection device configured to inspect an internal structure of an inspection target object in a three-dimensional shape by means of X-rays without destroying the inspection target object. Such an X-ray inspection device includes an X-ray image capturing system having an X-ray tube configured to output the X-rays to the inspection target object and an X-ray detector, such as a flat panel detector or an image intensifier (I.I.), configured to detect the X-rays having been output from the X-ray tube and having been transmitted through the inspection target object, a stage arranged between the X-ray tube and the X-ray detector such that the inspection target object is mounted on an upper surface of the stage, and a movement mechanism configured to move the stage and the X-ray image capturing system relative to each other.

The X-ray tube used for such an X-ray inspection device includes a filament (a cathode) to which high voltage is to be applied and a target (an anode). The X-ray tube has such a configuration that an electron beam emitted from the filament with the high voltage being applied and including thermal electrons collides with the target to generate the X-rays.

In this X-ray tube, the target is consumed due to repeated collision with the electron beam. That is, the target is gradually consumed as X-ray generation time advances. It has been known that in association with consumption of the target, the intensity (the amount) of X-rays generated under certain tube voltage and current decreases (see WO 2003/092336). For this reason, the intensity of the X-rays generated under the certain tube voltage and current is measured so that the degree of consumption of the target can be estimated.

SUMMARY OF THE INVENTION

An X-ray inspection device comprises: an X-ray tube configured to cause an electron beam to collide with a target, thereby generating an X-ray; an X-ray detector configured to detect the X-ray having been output from the X-ray tube and having been transmitted through an inspection target object; a measurement section configured to detect the X-ray output from the X-ray tube for a predetermined period by the X-ray detector to detect an X-ray amount in the predetermined period, thereby measuring a maximum value Imax and a minimum value Imin of the X-ray amount in the predetermined period; and a calculation section configured to calculate an X-ray amount fluctuation rate by using the maximum value Imax and the minimum value Imin of the X-ray amount measured by the measurement section.

The rate of fluctuation in an X-ray amount is calculated using the maximum value Imax and the minimum value Imin of the X-ray amount in a certain period, and consumption of a target is determined based on such a calculation value. Thus, even when a chronological change in the X-ray amount occurs, the degree of consumption of the target can be accurately estimated.

The X-ray inspection device further comprises: a fluctuation rate display section configured to display the X-ray amount fluctuation rate calculated by the calculation section.

The X-ray inspection device further comprises: a determination section configured to determine that the target is consumed when the X-ray amount fluctuation rate calculated by the calculation section exceeds a preset threshold.

The calculation section calculates the X-ray amount fluctuation rate based on [(Imax−Imin)/Imax].

The calculation section calculates the X-ray amount fluctuation rate based on [Imin/Imax].

The measurement section measures the maximum value Imax and the minimum value Imin of the X-ray amount as an average of detection values obtained in a certain area of the X-ray detector.

The measurement section measures the maximum value Imax and the minimum value Imin of the X-ray amount as a peak value in distribution of detection values obtained in a certain area of the X-ray detector.

Even in a case where there is an abnormal value due to a defective pixel in an X-ray detector, the average of detection values obtained in a certain area or a peak value in luminance distribution is used so that the degree of consumption of the target can be accurately estimated.

A method for determining a degree of consumption of a target of an X-ray tube in an X-ray inspection device for determining the degree of consumption of the target, the X-ray inspection device including the X-ray tube configured to cause an electron beam to collide with the target to generate an X-ray and an X-ray detector configured to detect the X-ray having been output from the X-ray tube and having been transmitted through an inspection target object, comprises: detecting the X-ray output from the X-ray tube for a predetermined period by the X-ray detector to detect an X-ray amount in the predetermined period, thereby measuring a maximum value Imax and a minimum value Imin of the X-ray amount in the predetermined period; calculating an X-ray amount fluctuation rate by using the maximum value Imax and the minimum value Imin of the X-ray amount; and determining the degree of consumption of the target from the X-ray amount fluctuation rate.

BRIEF DESCRIPTION OF THE DRAWINGS

FIG. 6 is a graph showing a chronological change in the amount of X-rays output from an X-ray tube.

DETAILED DESCRIPTION OF THE EXEMPLARY EMBODIMENTS

Fluctuation in the amount of X-rays output from an X-ray tube is not so simple. FIG. 6 is a graph showing a chronological change in the amount of X-rays output from the X-ray tube.

The graph shown in FIG. 6 shows an X-ray amount measurement result obtained in such a manner that in an X-ray tube with a consumed target, X-rays output from the X-ray tube are detected by an X-ray detector and are measured in a sampling cycle of one second for 30 minutes. Note that the horizontal axis of the graph indicates time (minutes), and the vertical axis indicates an X-ray amount (R/min) per minute.

As shown in this figure, the amount of X-rays output from the X-ray tube increases/decreases over time. For example, in the measurement result shown by the graph, the X-ray amount reaches the maximum value Imax right after driving of the X-ray tube, and reaches the minimum value Imin after a lapse of about 10 minutes. The X-ray amount repeatedly slightly increases/decreases around the point of the minimum value Imin. It is assumed that such a change is caused by a change in a collision position (a focal position) of the target with an electron beam during dose measurement due to thermal expansion of the target or a member supporting the target in association with collision of the electron beam. That is, the X-ray amount decreases when the electron beam collides with a deteriorated region of the target, and increases when the electron beam collides with a non-deteriorated region of the target. For this reason, when the degree of consumption of the target is determined by measurement of the X-ray amount at the timing of increasing or decreasing the X-ray amount, there is a problem that an accurate consumption degree cannot be reflected.

The present invention has been made for solving the above-described problem, and is intended to provide an X-ray inspection device configured to accurately estimate the degree of consumption of a target even when a chronological change in an X-ray amount occurs and the method for determining the degree of consumption of the target of an X-ray tube in the X-ray inspection device.

Figure 1:
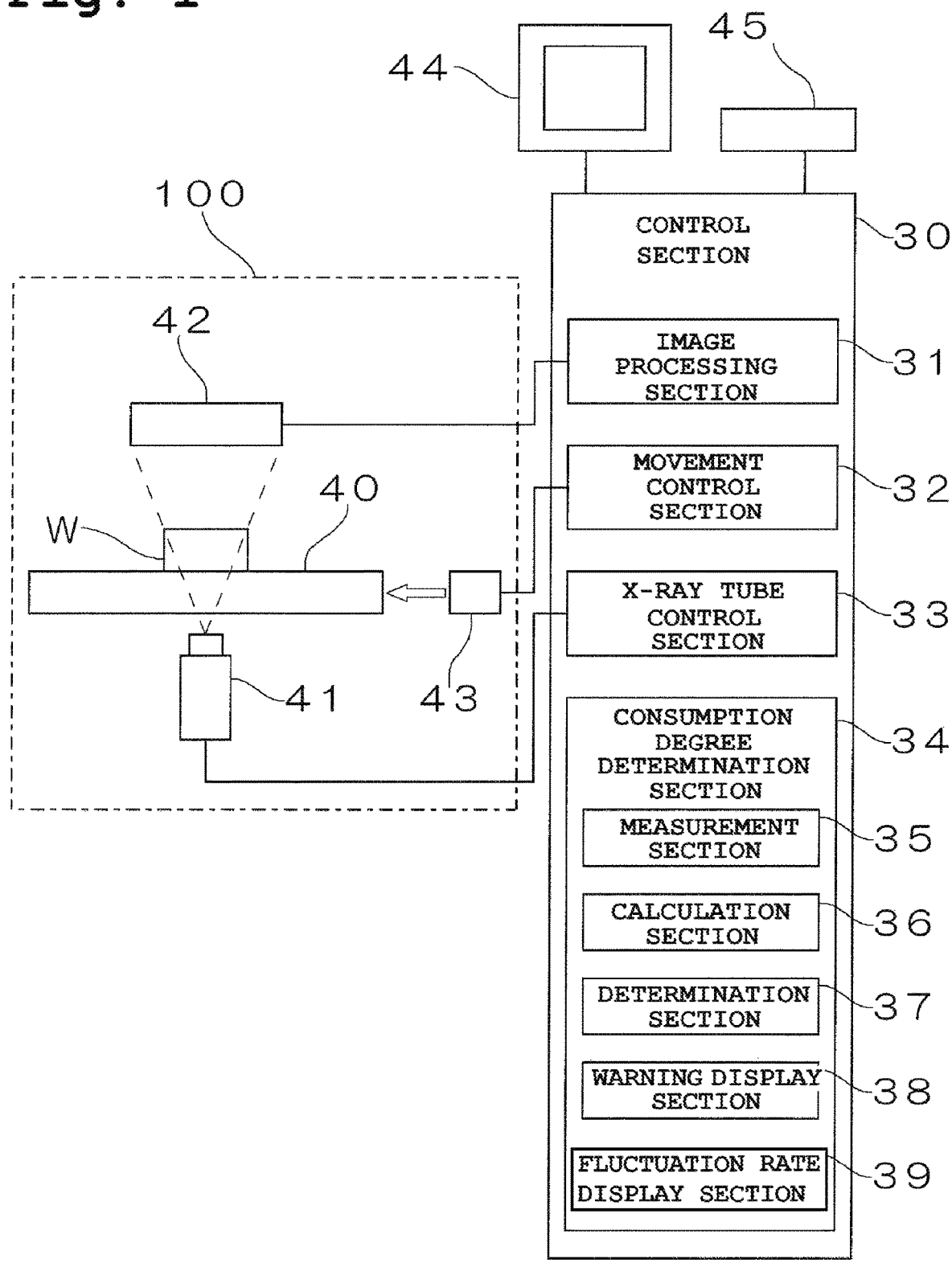
FIG. 1 is a schematic view of an X-ray inspection device of the present invention together with a main control system thereof.

Hereinafter, an embodiment of the present invention will be described with reference to the drawings. FIG. 1 is a schematic view of the X-ray inspection device of the present invention together with a main control system thereof.

The X-ray inspection device according to the present invention includes an X-ray generation section 41 having a later-described X-ray tube 1 for outputting X-rays to a work W as an inspection target object, an X-ray detector 42, such as a flat panel detector or an image intensifier (I.I.), configured to detect the X-rays having been transmitted through the work W after the X-rays have been output from the X-ray generation section 41, and a stage 40 arranged between the X-ray generation section 41 and the X-ray detector 42 for mounting the work W. The stage 40 is movable in two directions perpendicular to each other in the horizontal plane due to action of a stage movement mechanism 43 including a not-shown motor. The X-ray generation section 41, the X-ray detector 42, the stage 40, and the stage movement mechanism 43 are arranged inside a case 100 including an X-ray blocking member.

Figure 2:
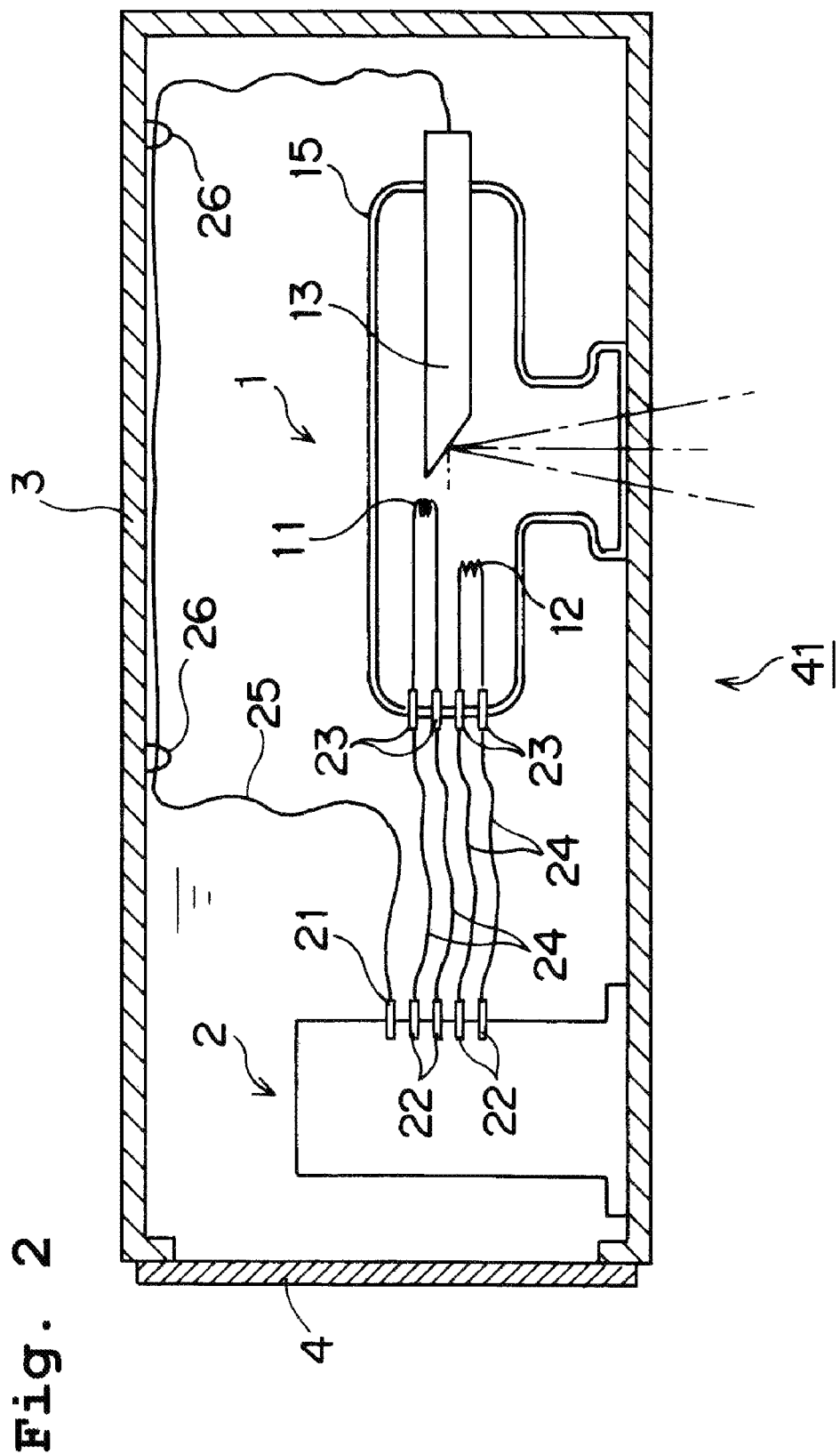
FIG. 2 is a schematic view of an X-ray generation section 41 including an X-ray tube 1.

FIG. 2 is a schematic view of the X-ray generation section 41 including the X-ray tube 1.

The X-ray generation section 41 has such a configuration that the X-ray tube 1 and a high-voltage generation section 2 are housed in a chamber including a housing 3 and a lid 4. The chamber including the housing 3 and the lid 4 is filled with insulating oil. Note that an insulating method is not limited to use of the insulating oil, and an insulating solid or gas may be used.

The X-ray tube 1 includes a glass tube body 15 and multiple terminals 23 arranged across the inside and outside of the glass tube body 15. Moreover, in the glass tube body 15, a filament 11, a heater 12, and a target 13 are arranged. The filament 11 described herein is for emitting an electron beam to the target 13. The electron beam emitted from the filament 11 collides with the target 13, thereby generating an X-ray. This X-ray is output to the outside of the X-ray tube 1. Moreover, the heater 12 is also called a getter, and is used for adsorbing gas molecules in the glass tube body 15.

The target 13 is connected to a terminal 21 of the high-voltage generation section 2 via a cable 25, and high voltage for accelerating an electron beam is provided from the high-voltage generation section 2 to the target 13. The cable 25 is supported by a support member 26 arranged on a ceiling portion of the housing 3. Moreover, the terminals 23 of the X-ray tube 1 connected to the filament 11 and the heater 12 as described above are each connected to terminals 22 of the high-voltage generation section 2 via cables 24. Filament current is provided to the filament 11 from the high-voltage generation section 2 via the terminals 22, the cables 24, and the terminals 23. Moreover, heater current is provided to the heater 12 from the high-voltage generation section 2 via the terminals 22, the cables 24, and the terminals 23.

Note that in FIG. 2, the X-ray tube 1 having such a closed configuration that the filament 11, the target 13 and the like are arranged in the glass tube body 15 as a closed container is employed. However, the present invention is also applicable to an X-ray inspection device including an open X-ray tube configured such that a filament 11, a target 13 and the like are replaceable as stand-alone units.

Referring back to FIG. 1, the X-ray inspection device according to the present invention includes, for example, a CPU configured to execute logical calculation as a processor, a ROM configured to store an operation program necessary for device control, and a RAM configured to temporarily store data or the like in control. The X-ray inspection device further includes a control section 30 configured to control the entirety of the device. The control section 30 includes a computer on which software is installed. The function of each section in the control section 30 is implemented by execution of the software installed on the computer.

The control section 30 is connected to a display section 44, such as a liquid crystal display panel, configured to display, e.g., an X-ray image detected by the X-ray detector 42 and the rate of fluctuation in the X-ray amount as described later and an operation section 45 including a mouse, a keyboard and the like for executing various types of operation. Moreover, the control section 30 includes, as functional configurations, an image processing section 31 configured to perform image processing for the X-ray image detected by the X-ray detector 42 to display the resultant image on the display section 44, a movement control section 32 configured to control the stage movement mechanism 43, an X-ray tube control section 33 configured to control lighting of the X-ray tube 1, and a consumption degree determination section 34 configured to determine the degree of consumption of the target 13 in the X-ray tube 1.

Further, the consumption degree determination section 34 includes: a measurement section 35 configured to detect the X-rays output from the X-ray tube 1 for a predetermined period by means of the X-ray detector 42 to detect the X-ray amount in such a period in a state in which the work is not mounted on the stage 40, thereby measuring the maximum value Imax and the minimum value Imin of the X-ray amount in the period; a calculation section 36 configured to calculate the rate of fluctuation in the X-ray amount by means of the maximum value Imax and the minimum value Imin of the X-ray amount measured by the measurement section 35; a determination section 37 configured to determine that the target 13 of the X-ray tube 1 is consumed when the X-ray amount fluctuation rate calculated by the calculation section 36 exceeds a preset threshold; a warning display section 38 configured to display a warning when the determination section 37 determines that the target 13 of the X-ray tube 1 is consumed; and a fluctuation rate display section 39 configured to display the X-ray amount fluctuation rate calculated by the calculation section 36 on the display section 44.

In the X-ray tube 1 used for the above-described X-ray inspection device, the target 13 is consumed due to repeated collision with the electron beam as use time of the X-ray tube 1 increases. The inventor(s) and the like of the present invention have recognized that when the target 13 is consumed, fluctuation in the amount of X-rays output from the X-ray tube 1 becomes great. That is, in a case where the X-rays are continuously output from the X-ray tube 1, when the X-ray amount is continuously measured for 30 minutes and fluctuation in the X-ray amount for these 30 minutes is measured in every 1000 hours of continuous output time, it has been confirmed that fluctuation in the amount of X-rays output from the X-ray tube 1 becomes greater as the continuous output time of the X-ray tube 1 increases and the target 13 is consumed.

For this reason, in this X-ray inspection device, fluctuation in the X-ray amount is, for example, measured based on the maximum value and the minimum value of the X-ray amount for a certain period such as about 30 minutes to calculate the rate of fluctuation in the X-ray amount, and in this manner, the degree of consumption of the target 13 is determined. When the fluctuation rate exceeds the preset threshold, it is determined that the target 13 is consumed to such an extent that the target 13 needs be to replaced, and a warning for suggesting replacement of the X-ray tube 1 or the target 13 is displayed.

Note that in this X-ray inspection device, the degree of consumption of the target 13 is determined upon aging. That is, when use is resumed at the start of a work of the day or after a non-use state has been continued for a certain period, the following process called aging is performed: tube voltage is gradually increased after low tube voltage has been applied to the X-ray tube 1 to melt a foreign object such as a protrusion of a high-voltage application section with the same potential as that of the target 13 as a cause for electric field concentration, and in this manner, a smooth equipotential surface is formed; and consequently, high-voltage resistance characteristics are improved. At this point, the degree of consumption of the target 13 is determined using a pixel value of the X-ray image detected with predetermined tube voltage and current by the X-ray detector 42. Note that the degree of consumption of the target 13 may be determined at other types of timing.

When the degree of consumption of the target 13 is determined, the measurement section 35 of the consumption degree determination section 34 initially detects, by means of the X-ray detector 42, the X-rays output from the X-ray tube 1 for the predetermined period in a state in which the work W is not mounted on the stage 40, i.e., a state in which the X-rays can be uniformly output from the X-ray generation section 41 to the X-ray detector 42. In this manner, the measurement section 35 detects the X-ray amount in this period. Such an X-ray amount is calculated by the measurement section 35 based on a luminance value of each pixel indicating X-ray intensity detected by the X-ray detector 42.

Figure 3:
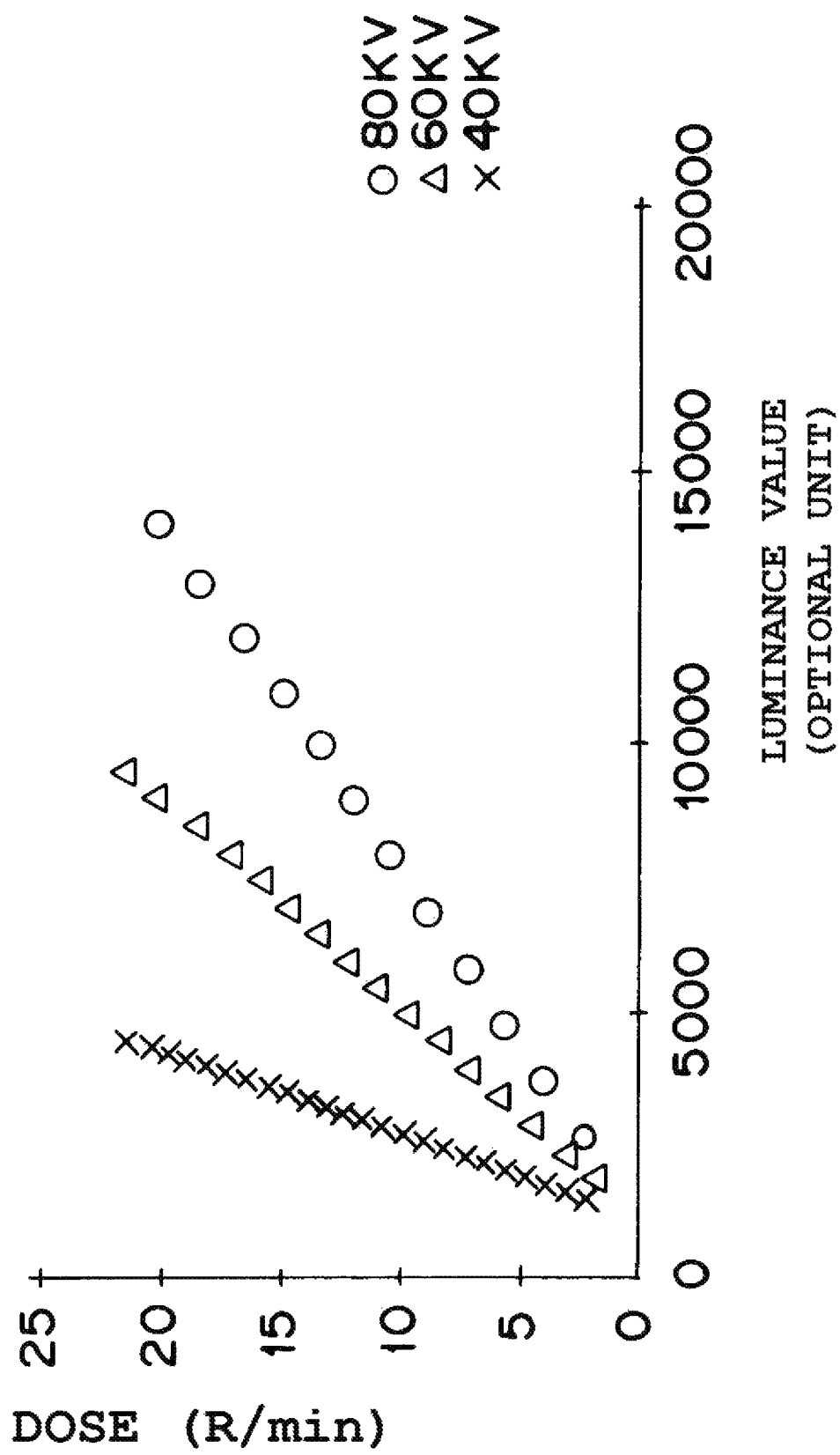
FIG. 3 is a graph showing a relationship between the amount of X-rays output from the X-ray tube 1 and a luminance value of each pixel when these X-rays are detected by an X-ray detector 42.

FIG. 3 is a graph showing a relationship between the amount of X-rays output from the X-ray tube 1 and the luminance value of each pixel when these X-rays are detected by the X-ray detector 42.

In this graph, the relationship between the X-ray amount and the luminance value when the tube current gradually increases, supposing that the tube voltage to be applied to the X-ray tube 1 is, for example, 80 kV, 60 kV, and 40 kV. Note that in this graph, the vertical axis indicates the X-ray amount (R/min), and the horizontal axis indicates the luminance value (an optional unit). As shown in the graph, the amount of X-rays output from the X-ray tube 1 and the luminance value of each pixel when the X-rays are detected by the X-ray detector 42 are in a proportional relationship. Thus, the X-rays output from the X-ray tube 1 are detected by the X-ray detector 42 so that the X-ray amount can be calculated based on the luminance value measured by the X-ray detector 42.

Note that in measurement of the X-ray amount, the X-ray amount is determined based on the average of luminance detection values in a certain area of the X-ray detector 42. Thus, even in a case where there is an abnormal pixel value due to a defective pixel of the X-ray detector 42, the average is utilized so that accuracy of the measurement value can be ensured. Note that the certain area is preferably selected from an area in the vicinity of the center of an X-ray detection area of the X-ray detector 42. Note that the X-ray amount may be calculated based on an average in other areas of the X-ray detector 42. Alternatively, the X-ray amount may be calculated based on the average of measurement values of all X-ray detection areas of the X-ray detector 42.

In measurement of the X-ray amount, the maximum value Imax and the minimum value Imin of the X-ray amount may be measured as peak values in distribution of the detection values obtained in the certain area of the X-ray detector 42 instead of utilizing the average of the luminance detection values in the certain area of the X-ray detector 42. That is, the greatest one of the detection values obtained in the certain area of the X-ray detector 42 may be taken as the maximum value Imax of the X-ray amount, and the smallest one of the detection values may be taken as the minimum value Imin of the X-ray amount.

The X-ray amount measured in such a manner that the X-rays output from the X-ray tube 1 are detected by the X-ray detector 42 for, e.g., 30 minutes has the value as in the graph shown in FIG. 6. From the X-ray amount measured over time as described above, the measurement section 35 measures the maximum value Imax and the minimum value Imin of the X-ray amount in such a period. Then, the calculation section 36 calculates the rate of fluctuation in the X-ray amount by means of the maximum value Imax and the minimum value Imin of the X-ray amount measured by the measurement section 35.

Such a fluctuation rate calculation result is displayed on the display section 44 by the fluctuation rate display section 39. Thus, an operator can recognize the rate of fluctuation in the X-rays, and consumption of the target 13 of the X-ray tube 1 can be predicted based on the rate of fluctuation in the X-rays.

Figure 4:
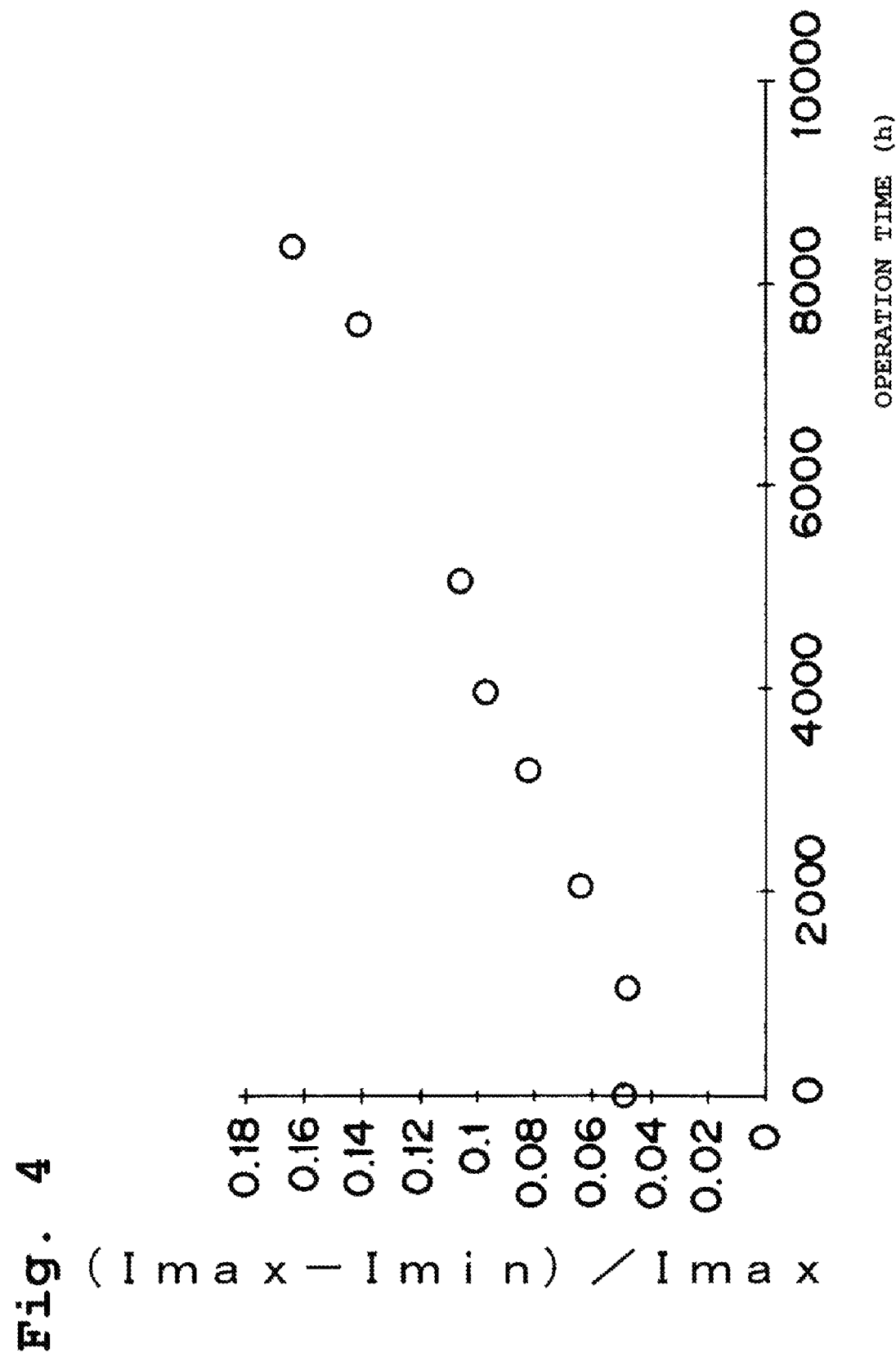
FIG. 4 is a graph showing a relationship between the value of [(Imax−Imin)/Imax] calculated based on the maximum value Imax and the minimum value Imin of the X-ray amount and drive time of the X-ray tube 1.

FIG. 4 is a graph showing a relationship between the value of [(Imax−Imin)/Imax] calculated based on the maximum value Imax and the minimum value Imin of the X-ray amount and operation time of the X-ray tube 1.

In this figure, the vertical axis indicates the value of [(Imax−Imin)/Imax], and the horizontal axis indicates the operation time (h). In this figure, the following configuration can be employed: based on an assumption that fluctuation in the amount of X-rays output from the X-ray tube 1 becomes greater as the target 13 is consumed, when the value of [(Imax−Imin)/Imax] calculated by the calculation section 36 reaches equal to or greater than a certain value, it is determined that the target 13 reaches such a consumption degree that the X-ray tube 1 needs to be replaced.

That is, when the X-ray amount fluctuation rate calculated based on [ (Imax−Imin)/Imax] exceeds above the preset threshold, the determination section 37 determines that the target 13 of the X-ray tube 1 is consumed. For example, in the graph shown in FIG. 4, when the value of [ (Imax−Imin)/Imax] reaches greater than 0.12, the determination section 37 determines that the target 13 of the X-ray tube 1 is consumed. At this point, when 8000 hours as drive time of the X-ray tube 1 has elapsed, the determination section 37 determines that the target 13 of the X-ray tube 1 is consumed.

Then, when the determination section 37 determines that the target 13 of the X-ray tube 1 is consumed, the warning display section 38 displays the warning on the display section 44. Note that the warning may be displayed via sound or light.

With this configuration, consumption of the target 13 can be notified in advance, and replacement of the target 13 or the X-ray tube 1 can be suggested. Thus, unavailability of X-ray inspection due to consumption of the target 13 can be prevented in advance.

Figure 5:
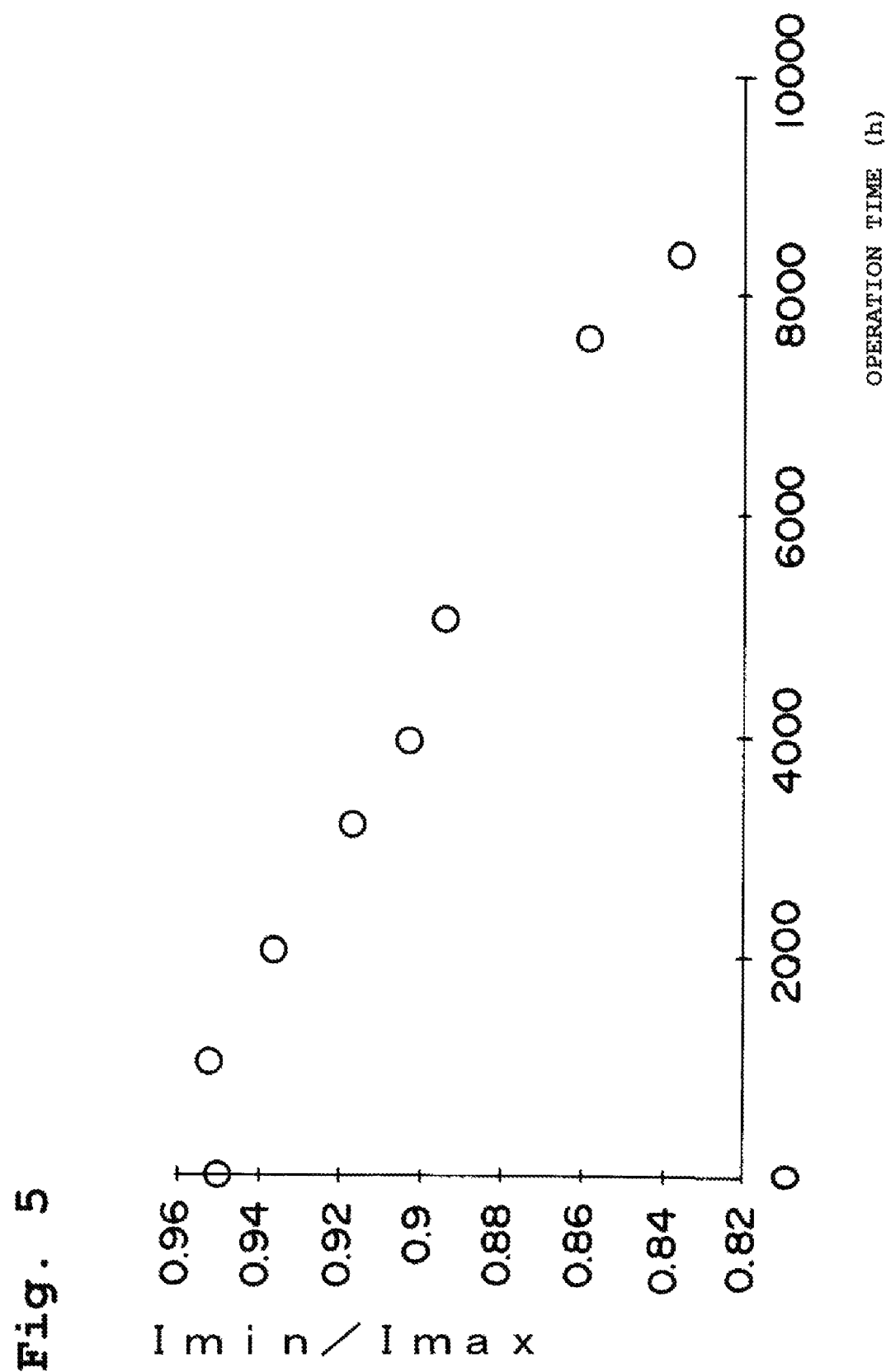
FIG. 5 is a graph showing a relationship between the value of [Imin/Imax] calculated based on the maximum value Imax and the minimum value Imin of the X-ray amount and the drive time of the X-ray tube 1.

Other embodiments for calculating the rate of fluctuation in the X-ray amount by means of the maximum value Imax and the minimum value Imin of the X-ray amount will be described. FIG. 5 is a graph showing a relationship between the value of [Imin/Imax] calculated based on the maximum value Imax and the minimum value Imin of the X-ray amount and the operation time of the X-ray tube 1.

In this figure, the vertical axis indicates the value of [Imin/Imax], and the horizontal axis indicates the operation time (h). In this figure, the following configuration can be employed: based on an assumption that fluctuation in the amount of X-rays output from the X-ray tube 1 becomes greater as the target 13 is consumed, when the value of [Imin/Imax] calculated by the calculation section 36 reaches equal to or less than a certain value, it is determined that the target 13 reaches such a consumption degree that the X-ray tube 1 needs to be replaced.

That is, when the X-ray amount fluctuation rate calculated based on [Imin/Imax] falls below the preset threshold, the determination section 37 determines that the target 13 of the X-ray tube 1 is consumed. For example, in the graph shown in FIG. 5, when the value of [Imin/Imax] reaches less than 0.85, the determination section 37 determines that the target 13 of the X-ray tube 1 is consumed. At this point, when 8000 hours as the drive time of the X-ray tube 1 has elapsed, the determination section 37 determines that the target 13 of the X-ray tube 1 is consumed.

Then, when the determination section 37 determines that the target 13 of the X-ray tube 1 is consumed, the warning display section 38 displays the warning on the display section 44. In this embodiment, consumption of the target 13 can be also notified in advance, and replacement of the target 13 or the X-ray tube 1 can be also suggested.

Note that in the above-described embodiments, the case where the present invention is applied to the X-ray inspection device configured to inspect an internal structure of the inspection target object in a three-dimensional shape by means of the X-rays without destroying the inspection target object has been described. However, the present invention may be applied to other X-ray inspection devices such as a medical X-ray inspection device configured to acquire an X-ray image of an examinee, for example.

What is claimed is:

1. An X-ray inspection device comprising:
   an X-ray tube configured to cause an electron beam to collide with a target, thereby generating an X-ray;
   an X-ray detector configured to detect the X-ray having been output from the X-ray tube and having been transmitted through an inspection target object;
   a measurement section configured to detect the X-ray output from the X-ray tube for a predetermined period by the X-ray detector to detect an X-ray amount in the predetermined period, thereby measuring a maximum value Imax and a minimum value Imin of the X-ray amount in the predetermined period; and
   a calculation section configured to calculate an X-ray amount fluctuation rate by using the maximum value Imax and the minimum value Imin of the X-ray amount measured by the measurement section.

2. The X-ray inspection device according to claim 1, further comprising:
   a fluctuation rate display section configured to display the X-ray amount fluctuation rate calculated by the calculation section.

3. The X-ray inspection device according to claim 1, further comprising:
   a determination section configured to determine that the target is consumed when the X-ray amount fluctuation rate calculated by the calculation section exceeds a preset threshold.

4. The X-ray inspection device according to claim 1, wherein
   the calculation section calculates the X-ray amount fluctuation rate based on [(Imax−Imin)/Imax].

5. The X-ray inspection device according to claim 1, wherein
   the calculation section calculates the X-ray amount fluctuation rate based on [Imin/Imax].

6. The X-ray inspection device according to claim 1, wherein
   the measurement section measures the maximum value Imax and the minimum value Imin of the X-ray amount as an average of detection values obtained in a certain area of the X-ray detector.

7. The X-ray inspection device according to claim 1, wherein
   the measurement section measures the maximum value Imax and the minimum value Imin of the X-ray amount as a peak value in distribution of detection values obtained in a certain area of the X-ray detector.

8. A method for determining a degree of consumption of a target of an X-ray tube in an X-ray inspection device for determining the degree of consumption of the target, the X-ray inspection device including the X-ray tube configured to cause an electron beam to collide with the target to generate an X-ray and an X-ray detector configured to detect the X-ray having been output from the X-ray tube and having been transmitted through an inspection target object, including the step of:

detecting the X-ray output from the X-ray tube for a predetermined period by the X-ray detector to detect an X-ray amount in the predetermined period, thereby measuring a maximum value Imax and a minimum value Imin of the X-ray amount in the predetermined period;

calculating an X-ray amount fluctuation rate by using the maximum value Imax and the minimum value Imin of the X-ray amount; and determining the degree of consumption of the target from the X-ray amount fluctuation rate.

9. The method according to claim 8, further including the step of:

displaying the X-ray amount fluctuation rate calculated.

10. The method according to claim 8, wherein the step of determining determines that the target is consumed when the X-ray amount fluctuation rate calculated exceeds a preset threshold.

11. The method according to claim 8, wherein the step of calculating calculates the X-ray amount fluctuation rate based on [(Imax−Imin)/Imax].

12. The method according to claim 8, wherein the step of calculating calculates the X-ray amount fluctuation rate based on [Imin/Imax].

13. The method according to claim 8, wherein the step of detecting measures the maximum value Imax and the minimum value Imin of the X-ray amount as an average of detection values obtained in a certain area of the X-ray detector.

14. The method according to claim 8, wherein the step of detecting measures the maximum value Imax and the minimum value Imin of the X-ray amount as a peak value in distribution of detection values obtained in a certain area of the X-ray detector.

\* \* \* \* \*